(12) United States Patent
Talamini, Sr.

(10) Patent No.: US 6,353,698 B1
(45) Date of Patent: Mar. 5, 2002

(54) BUSHING FOR SECURING THE POSITION OF THE PROTECTIVE JACKET OF A JACKETED FIBER

(75) Inventor: Victor J. Talamini, Sr., Ashbury, NJ (US)

(73) Assignee: TyCom Inc., Morristown, NJ (US)

( * ) Notice: Subject to any disclaimer, the term of this patent is extended or adjusted under 35 U.S.C. 154(b) by 0 days.

(21) Appl. No.: 09/317,191

(22) Filed: May 24, 1999

(51) Int. Cl.$^7$ .................................................. G02B 6/00
(52) U.S. Cl. ..................... 385/137; 385/138; 174/153 G
(58) Field of Search ................................. 385/136–139; 174/153 G

(56) References Cited

U.S. PATENT DOCUMENTS

| | | | | |
|---|---|---|---|---|
| 3,562,847 A | * | 2/1971 | Jemison | 174/153 G |
| 3,634,608 A | * | 1/1972 | Buhl et al. | 174/153 G |
| 4,188,003 A | * | 2/1980 | Ramsey | 174/153 G |
| 5,547,396 A | * | 8/1996 | Jordhamo | 439/604 |
| 5,898,813 A | * | 4/1999 | Beier | 385/139 |
| 6,097,873 A | * | 8/2000 | Filas et al. | 385/139 |

* cited by examiner

Primary Examiner—Jon Henry

(57) ABSTRACT

An improved bushing for securing the position of the protective jacket of a jacketed optical fiber with respect to an optical component is provided. The improved bushing includes an elastomeric structure having a first end, a second end, and a jacketed fiber receiving surface. First and second flanges for engaging corresponding cavities within the optical component are attached to opposite sides of the elastomeric structure. The elastomeric structure further defines a cylindrical internal pathway for receiving a jacketed optical fiber, which includes the protective jacket(s) to be secured. The internal pathway runs approximately along the longitudinal centerline of the elastomeric structure from the first end to the second end and has a diameter approximately equal to the diameter of the jacketed optical fiber. The elastomeric structure also defines a channel from the internal pathway to the jacketed fiber receiving surface and which extends along the entire length of the internal pathway. Further, the elastomeric structure has an expanded state, an undeformed state, and a compressed state, and when the elastomeric structure is in its expanded state, the channel's width is approximately the diameter of the internal pathway; when the elastomeric structure is in its undeformed state, the channel's width is less than the diameter of the internal pathway; and when the elastomeric structure is in its compressed state, the channel's width is less than it is when the elastomeric structure is in its undeformed state. A notch may also be defined in the jacketed fiber receiving surface.

29 Claims, 2 Drawing Sheets

BUSHING FOR SECURING THE POSITION OF THE PROTECTIVE JACKET OF A JACKETED FIBER

FIELD OF THE INVENTION

The present invention relates to the field of fiber and fiber jacket retention devices and, more particularly, to an improved bushing for securing the position of the protective jacket of a jacketed optical fiber with respect to an optical component in an optical amplifying repeater.

BACKGROUND OF THE INVENTION

Optical amplifiers comprise vital components in today's optical submarine transmission systems. An optical amplifier is an optical device in which a section of rare earth doped optical fiber is pumped with light at the wavelength of the rare earth dopant, thereby causing population inversion of the dopant. The population inversion causes a signal to propagate at a signal wavelength along the fiber.

Erbium (Er) (atomic number 68) is particularly suited for use as a dopant in an optical amplifier. In particular, when erbium is excited it emits light at 1.54 µm, which coincidentally is a low-loss wavelength for silica optical fibers. Thus, a signal may be amplified through an erbium-doped fiber amplifier (EDFA) by the process of "stimulated emission." Specifically, when energy in the form of photons, such as from a laser diode, is pumped into the erbium atoms it causes the outer electrons of the erbium to jump to an excited state. When the erbium atoms subsequently are allowed to relax to a stable state, they release a 1.54 µm photon.

In an optical submarine transmission system, the optical signal that is being transmitted through the submarine optical fiber cable becomes attenuated over the In an optical submarine transmission system, the optical signal that is being transmitted through the submarine optical fiber cable becomes attenuated over the length of the transmission system, which may stretch thousands of miles. To compensate for this signal attenuation, optical repeaters are strategically positioned along the cable length. In the past, these optical repeaters were "regenerative" repeaters in which the optical signal being transmitted was first converted into an electrical signal, subjected to given processing (such as waveform shaping), and then converted back into an optical signal for further transmission through the cable. Today, however, more and more submarine optical fiber cable systems rely on "optical amplifying repeaters" (e.g., EDFAs) to compensate for signal attenuation and to boost signal strength.

In a typical EDFA, the optical fiber carrying the optical signal enters the EDFA and its signal is coupled through an optical coupler to the pumping light generated by one or more laser diodes (usually pumping at 980 nm or 1480 nm). Upon leaving the optical coupler, this coupled signal is carried by a short section of optical fiber that is ultimately spliced to a much longer section of erbium-doped optical fiber. Within the erbium-doped fiber, the erbium atoms of the doped fiber absorb the pumping light, thereby leading to population inversion and signal amplification. After the desired gain in signal strength has been achieved (which depends, in part, on the length of the section of erbium-doped fiber used in the EDFA), the pumping light is decoupled from the signal through a second optical coupler, thereby leaving only the amplified signal to continue through the optical fiber. The optical fiber carrying the amplified optical signal then exits the EDFA.

Bare optical fibers, however, are easily damaged by scratches or loads. Consequently, optical fibers are typically protected by one or more protective "jackets." In a typical "loose tube" fiber construction, a 10 mil optical fiber (i.e., an optical fiber with a diameter of approximately 0.01 inches (or "10 mil")) passes through a 40 mil "inner jacket," which is usually made of polyvinyl chloride (PVC). This inner jacket is then surrounded by an aramid strength member (e.g., Kevlar®) and a 60 mil "outer jacket" (also made of PVC). The optical fiber, however, is not secured to either jacket. Instead, the fiber is free to "float" within the inner jacket and move longitudinally with respect to the jackets. Indeed, in submarine cable systems, the length of optical fiber within a jacketed optical fiber cable is usually longer than the length of the jacket itself, thereby helping alleviate any loads on the optical fiber that may be caused by thermal expansion or contraction or by other sources.

The length of the erbium-doped optical fiber used in an EDFA can easily exceed 20 meters. Because it is very difficult to store this length of optical fiber loose within an EDFA (especially within an EDFA used in submarine cable systems, where space is at a premium), most erbium-doped optical fiber used in an optical amplifying repeater is stored inside an EDFA on a spool in an erbium-doped fiber module (EDFM) that has been designed specifically for storing large quantities of erbium-doped fiber. One way that it is possible to store such a large quantity of fiber in a small component such as an EDFM is because the erbium-doped fiber within the EDFM is stored on the fiber spool "jacketless"—i.e., after it has been stripped of its protective jackets-and thus has a much smaller diameter than regular "jacketed" optical fiber.

Outside of the EDFM, however, it is desirable that the optical fiber remain jacketed so that the fragile optical fiber itself is protected from damage. Indeed, because any damage to the fiber (even if only microscopic) may adversely affect the reliability of the EDFA (and, as a result, the reliability of the entire submarine optical fiber cable system), great efforts are normally taken to protect the optical fiber from damage.

Thus, to accomplish these dual goals of protecting the erbium-doped fiber from damage outside of the EDFM and facilitating the maximum amount of storage within the EDFM, it is preferable that the fiber be jacketed both when it enters and when it exits the EDFM, but jacketless within the EDFM itself. As discussed above, however, the optical fiber is free to "float" within its protective jackets and, conversely, the protective jackets are capable of moving longitudinally with respect to the optical fiber. Thus, the protective jackets of a jacketed optical fiber are preferably secured to the EDFM so that they do not move. If, for example, a protective jacket was allowed to move away from the EDFM, it might expose the optical fiber outside of the EDFM (and possibly allow the optical fiber to be damaged). Likewise, if a protective jacket was allowed to move freely into the EDFM, it may impinge the spool of "jacketless" optical fiber stored therein and possibly lead to signal loss or to fiber damage.

Consequently, it is advisable that the protective jackets of the optical fiber be coupled to the external structure of the EDFM both when the optical fiber enters and leaves the EDFM. Coupling the jackets to the EDFM will prevent the jackets from moving with respect to the EDFM and thus will reduce the likelihood that the fragile optical fiber will be exposed, damaged, or impinged, even though the optical fiber itself will still be able to "float" freely with respect to its protective jackets and the EDFM.

One way of coupling a protective jacket to an EDFM is to wrap a bulking agent around the jacket and then wedge the wrapped jacket into an opening in the EDFM. In theory, this arrangement allows the jacket section of doped fiber to be secured to the EDFM.

Alternatively, one may use a rubber plug or "bushing." In general, bushings are designed in such a way that the jacketed fiber could be pressed into the bushing and the bushing then placed into an opening in the EDFM. In the past, an element of the EDFM (e.g., a lid) would be closed, thereby applying a load onto the bushing itself and causing the bushing to compress and to "squeeze" the protective jackets of the optical fiber. In this manner, the jackets would be secured to the EDFM, but because the jackets are generally incompressible, the optical fiber itself would still be free to float through the jackets and would not be coupled to the exterior structure of the EDFM.

Using a separate element of the EDFM to generate a load on the bushing, however, is not necessarily practical given the design of today's EDFM trays. Moreover, using the lid of the EDFM to generate a load on the bushing is not advisable because when the lid is removed, the optical fiber stored on the spool within the EDFM could become dislocated. Instead, it would be desirable to have a bushing designed in such a way that the requisite "squeezing" load needed to secure the position of the optical fiber's protective jacket with respect to the EDFM (or any optical component) could be generated merely by wedging the bushing into an opening in the optical component.

SUMMARY OF THE INVENTION

In light of the above, an improved bushing for securing the position of the protective jacket of a jacketed optical fiber with respect to an optical component (specifically, an EDFM) is provided. The improved bushing includes an elastomeric structure having a first end, a second end, and a jacketed fiber receiving surface. First and second flanges for engaging corresponding cavities within the optical component are attached to opposite sides of the elastomeric structure. The elastomeric structure further defines a cylindrical internal pathway for receiving a jacketed optical fiber, which includes the protective jacket(s) to be secured. The internal pathway runs approximately along the longitudinal centerline of the elastomeric structure from the first end to the second end and has a diameter approximately equal to the diameter of the jacketed optical fiber. The elastomeric structure also defines a channel from the internal pathway to the jacketed fiber receiving surface and which extends along the entire length of the internal pathway. Further, the elastomeric structure has an expanded state, an undeformed state, and a compressed state, and when the elastomeric structure is in its expanded state, the channel's width is approximately the diameter of the internal pathway; when the elastomeric structure is in its undeformed state, the channel's width is less than the diameter of the internal pathway; and when the elastomeric structure is in its compressed state, the channel's width is less than it is when the elastomeric structure is in its undeformed state. A notch may also be defined in the jacketed fiber receiving surface for guiding the jacketed optical fiber into the channel.

BRIEF DESCRIPTION OF THE DRAWINGS

The invention will be more readily understood through the following detailed description, with reference to the accompanying drawings, in which.

DETAILED DESCRIPTION

The present invention is an improved bushing for securing the position of the protective jacket of a jacketed optical fiber. Although the present invention is designed to be used to secure the position of the protective jacket of a jacketed optical fiber with respect to an optical component (specifically, an EDFM), it may be used to secure the position of any jacket of any fiber or wire with respect to any component, optical or not. Moreover, it should be understood that the "protective jacket" of a jacketed optical fiber may be considered to be either the outer jacket alone or, as in the preferred embodiment of the invention, both the outer and inner jackets of the jacketed optical fiber. In addition, some optical fibers only have a single jacket (such as in a "tight-buffered" cable).

Figure 1:
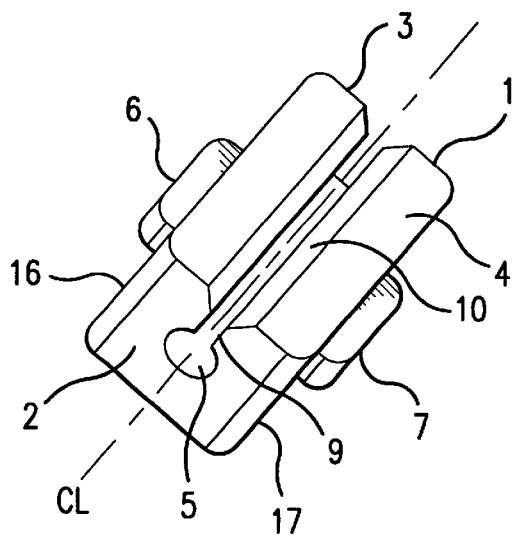
FIG 1 is a perspective view of the preferred embodiment of the invention.

The preferred embodiment of the present invention, shown in FIG. 1, comprises a elastomeric structure 1 having a first end 2, a second end 3, and a jacketed fiber receiving surface 4. A cylindrical internal pathway 5, which is sized to receive snugly a jacketed optical fiber $F_J$ (see FIG. 6), runs along the centerline $C_L$ of the elastomeric structure 1 from the first end 2 to the second end 3.

Although the elastomeric structure 1 shown in FIG. 1 may be thought of as being generally rectangular in shape, the elastomeric structure 1 may be any number of shapes, including cubical, cylindrical, spherical, etc. Consequently the first and second "ends" 2 and 3 and the jacketed fiber receiving "surface" 4 should be understood as being representative of general regions of the elastomeric structure 1, no matter what shape the elastomeric structure 1 ultimately may take. Likewise, while the centerline $C_L$ of the elastomeric structure 1 shown in FIG. 1 is also the longitudinal centerline of the elastomeric structure 1, the centerline $C_L$ would still be the centerline of the elastomeric structure 1 from the first end 2 to the second end 3 even if the "length" of the elastomeric structure 1 (i.e., the distance from the first end 2 to the second end 3) was less than the "width" or "height" of the elastomeric structure 1.

Figure 4:
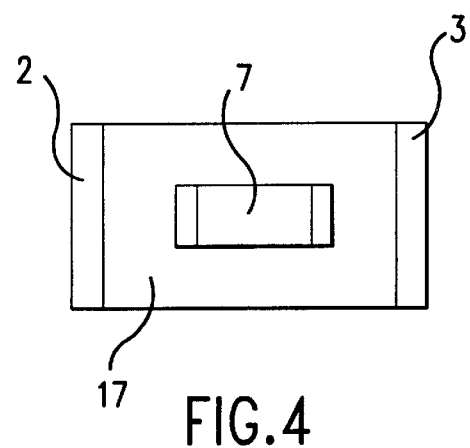
FIG. 4 is a side view of the embodiment shown in FIG. 1.
Figure 5:
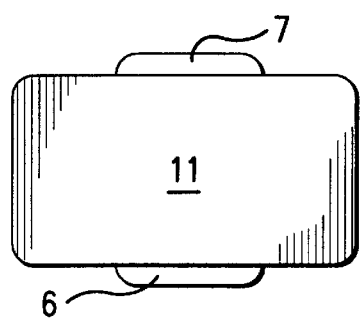
FIG. 5 is bottom view of the embodiment shown in FIG. 1.

The preferred embodiment of the invention also includes first and second flanges 6 and 7 for engaging corresponding first and second cavities 6a and 7a (shown in FIG. 6) of an optical component, such as an EDFM 8. In the preferred embodiment of the invention, first and second flanges 6 and 7 are attached to the elastomeric structure 1 at sides 16 and 17 respectively. As shown in FIGS. 4 and 5, the first and second flanges 6 and 7 are preferably centered (both vertically and horizontally) on sides 16 and 17 respectively (although only side 17 is shown in FIG. 4, side 16 is preferably the mirror image of side 17).

Figure 2:
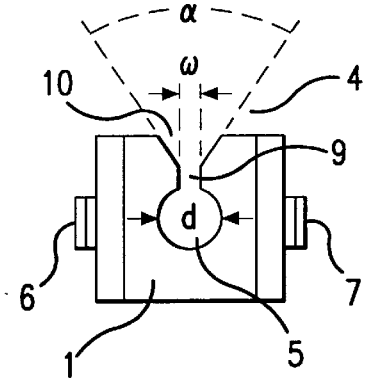
FIG. 2 is an end view of the embodiment shown in FIG. 1.
Figure 3:
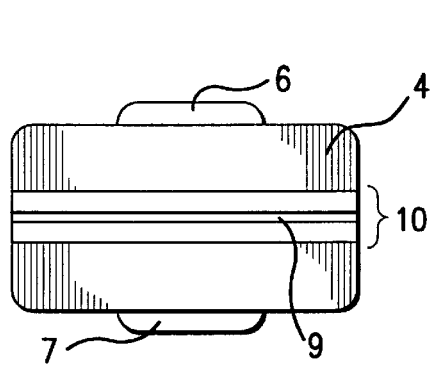
FIG. 3 is a top view of the embodiment shown in FIG. 1.

With reference to FIGS. 2 and 3, a channel 9 is also provided from the internal pathway 5 to the jacketed fiber receiving surface 4. In the preferred embodiment of the invention, the channel 9 runs along the entire length of the internal pathway 5. The purpose of the channel 9 is to allow the engineer or other individual who is using the disclosed bushing to position the jacketed optical fiber $F_J$ within the internal pathway 5 without having to thread the jacketed optical fiber $F_J$ longitudinally through the internal pathway 5 (i.e., from the first end 2 to the second end 3). Instead, the jacketed optical fiber $F_J$ may be "slid" into position laterally—i.e., from the jacketed fiber receiving surface 4. To facilitate this positioning process, the channel 9 is preferably designed to open up near jacketed fiber receiving surface 4 to form a "notch" 10 in the jacketed fiber receiving surface 4 for guiding the jacketed optical fiber $F_J$ into the channel 9 and, ultimately, into the internal pathway 5. In the preferred embodiment of the invention, the notch 10 forms an angle a of approximately 60°.

As shown in FIG. 2, however, the width w of the channel 9 is preferably less than the diameter d of the internal pathway 5 when the elastomeric structure 1 is in an undeformed state (in FIGS. 1–5, the elastomeric structure 1 is shown in its undeformed state). Moreover, the diameter of the jacketed optical fiber $F_J$ is approximately equal to (or slightly less than) the diameter d of the internal pathway 5. Consequently, the width w of the channel 9 preferably is capable of expanding to at least the diameter of the jacketed optical fiber $F_J$ (or, put another way, to approximately the diameter d of the internal pathway 5) to allow the jacketed optical fiber $F_J$ to "slide" laterally through the channel 9 and be positioned within the internal pathway 5.

As a result, the preferred embodiment of the invention preferably has an elastomeric structure 1 that is sufficiently elastomeric to allow the width w of the channel 9 to expand as needed to receive the jacketed optical fiber $F_J$. In the preferred embodiment of the invention, the elastomeric structure 1 is comprised of 50A durometer polyurethane, as are the first and second flanges 6 and 7.

Figure 6:
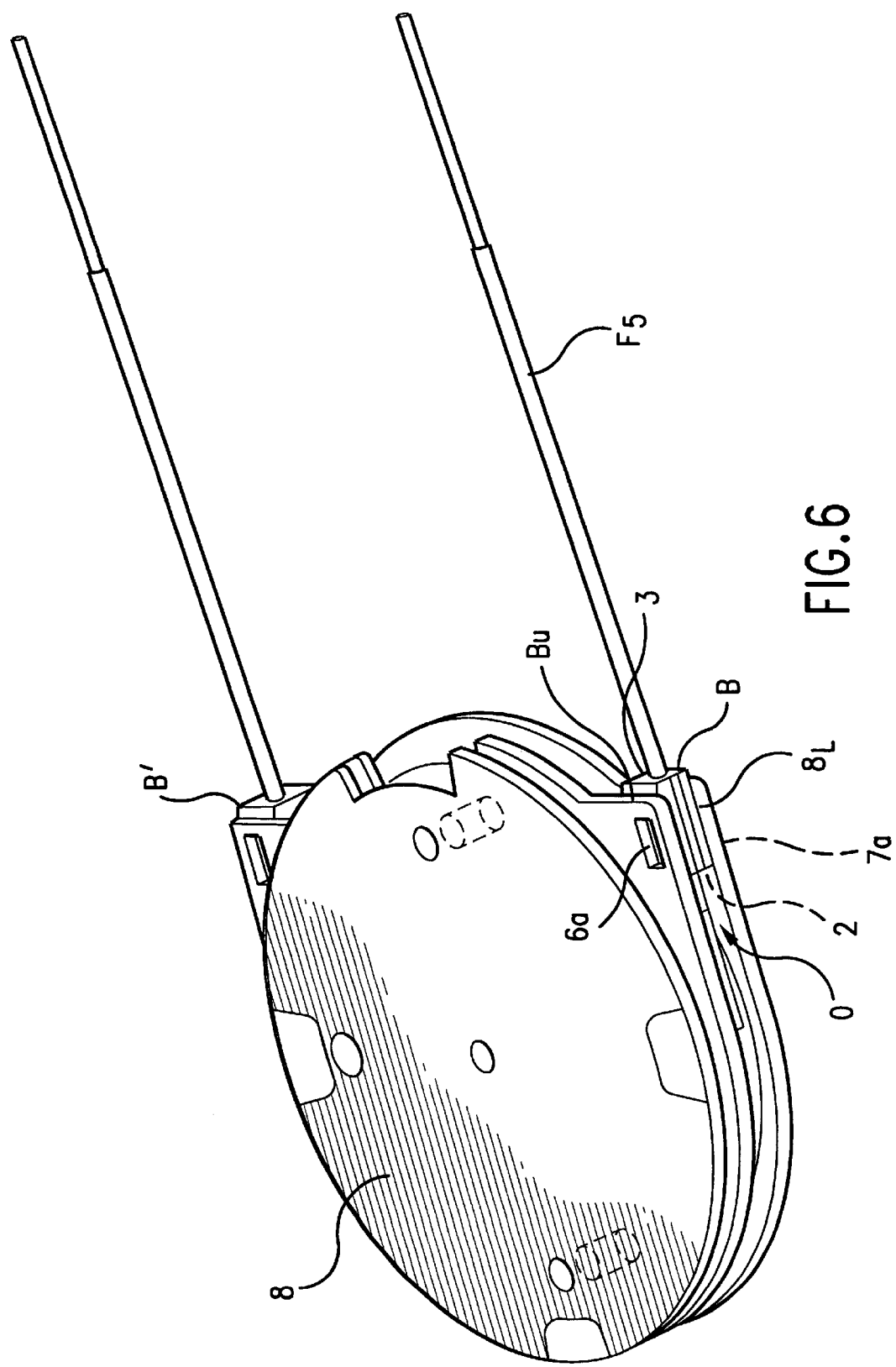
FIG. 6 shows the preferred embodiment of the invention engaged with an optical component to form a jacket retention system.

With reference to FIG. 6, the improved bushing B for securing the position of the protective jacket of a jacketed optical fiber will now be described with respect to an optical component, specifically the EDFM 8. Of course, the EDFM 8 may be equipped with two or more bushings B and B' to secure the position of the protective jacket of the jacketed optical fiber $F_J$ with respect to the EDFM 8 at two or more locations—e.g., both when the jacketed optical fiber $F_J$ enters and leaves the EDFM 8.

As seen in FIG. 6, the jacketed optical fiber $F_J$ may be aligned within the internal pathway 5 of the bushing B and the entire assembly inserted into an opening O defined between the upper $8_U$ and lower $8_L$ "shells" of the EDFM 8, thereby forming a jacket retention system. To facilitate securing the protective jacket of the jacketed optical fiber $F_J$, opening O preferably is sized to compress elastomeric bushing B into a compressed state when bushing B is inserted into the opening O. In the preferred embodiment of the invention, opening O is able to achieve this compressing function because its "height" (i.e., the distance between the lower surface of upper shell $8_U$ and the upper surface of lower shell $8_L$) is less than the "height" of the bushing B when the bushing B is in proper alignment to be inserted into the opening O (i.e., the "height" of the bushing B in this particular instance being the distance between sides 16 and 17).

When determining the height of the bushing B, it is not necessary to consider the first and second flanges 6 and 7 because the first and second flanges 6 and 7 are designed to engage corresponding first and second cavities 6a and 7a in the EDFM 8. Consequently, upper and lower shells $8_U$ and $8_L$ do not generally act on first and second flanges 6 and 7 once the bushing B has been positioned properly within the opening O. First and second flanges 6 and 7, however, do serve to stabilize and secure the bushing B within the EDFM 8 and help prevent the bushing B from sliding (either longitudinally or laterally) or rotating due to any load or torque that may be placed on the bushing B or on the jacketed optical fiber $F_J$.

As discussed previously, when the bushing B is inserted into the opening O, the geometry of the opening O will "squeeze" the bushing into what may be considered to be a "compressed" state (or a "deformed" or "squeezed" state), even though the material that comprises the elastomeric structure 1 may not itself be "compressible." Regardless, in this compressed state, the width w of the channel 9 is generally smaller than the width w of the channel 9 when the bushing B is in an undeformed state (as shown in FIG. 2). Likewise, the forces acting on bushing B from upper and lower shells $8_U$ and $8_L$ also force sides 16 and 17 closer together and reduce slightly the diameter d of the internal pathway 5 (when measured as shown in FIG. 2) so that the "fit" of the jacketed optical fiber $F_J$ within the internal pathway 5 becomes more "snug" once bushing B is compressed, thereby further reducing the likelihood that the protective jacket of the jacketed optical fiber $F_J$ will be able to move with respect to the bushing B.

Moreover, the bushing B itself is secured within the opening O of the EDFM 8 by the natural tendency of the bushing B to return to its undeformed state. Specifically, as sides 16 and 17 try to expand outward to their uncompressed position, they exert forces on upper and lower shells $8_U$ and $8_L$ and create frictional forces that must be overcome if the bushing B is to be removed from opening O. In addition, the first and second flanges 6 and 7 will also help resist any movement of the bushing B unless they are first disengaged from first and second cavities 6a and 7a. In this manner, the bushing B serves to secure effectively the position of the protective jacket of the jacketed optical fiber $F_J$ with respect to the EDFM 8.

As a result of being "squeezed" into the opening O, the bushing B is both secured with respect to the EDFM 8 and generates the requisite "squeezing" load needed to secure the position of the jacketed optical fiber $F_J$. Thus, the optical fiber's protective jacket may be secured simply and effectively merely by wedging the bushing B into the opening O. Of course, the design of the bushing B may be modified to so that the bushing B can be used with any optical component, regardless of the shape of the opening(s) in that component. Consequently, although the bushing B described above has been designed to be used to secure the position of the protective jacket of a jacketed optical fiber with respect to an optical component (specifically, an EDFM), it may just as easily be adapted and used to secure the position of the jacket of a wire with respect to an ordinary electrical component. This allows the bushing B to be used in a variety of telecommunication (and other) systems where it is desirable to anchor a protective jacket or coating separate from the fiber or wire that passes through the jacket. These and still further objects and advantages of the present invention should be readily apparent to those skilled in this art from the above-recited detailed description. Accordingly, the drawings and descriptions are to be regarded as illustrative in nature, and not as restrictive.

What is claimed is:

1. A bushing for securing the position of the protective jacket of a jacketed fiber with respect to a component, said bushing comprising:

an elastomeric structure having a first end, a second end, first and second substantially flat sides, and a jacketed fiber receiving surface;

a first flange attached to said first side of said elastomeric structure, said first flange being dimensioned and arrayed to engage a corresponding first cavity within said component;

a second flange attached to said second side of said elastomeric structure, said second flange being dimensioned and arrayed to engage a corresponding second cavity within said component;

said elastomeric structure defines one generally cylindrical internal pathway from said first end to said second end, said internal pathway having a diameter approximately equal to the diameter of the jacketed fiber and running approximately along the centerline of said elastomeric structure from said first end to said second end; and said elastomeric structure defines a channel from said internal pathway to said jacketed fiber receiving surface, said channel extending along substantially the entire length of said internal pathway.

2. The bushing as recited in claim 1, wherein said elastomeric structure has an expanded state, an undeformed state, and a compressed state, and when said elastomeric structure is in said expanded state, said channel has a width of approximately said diameter of said internal pathway, when said elastomeric structure is in said undeformed state, said channel has a width less than said diameter of said internal pathway, and when said elastomeric structure is in said compressed state, said channel has a width less than said width of said channel when said elastomeric structure is in said undeformed state.

3. The bushing as recited in claim 1, wherein said elastomeric structure further defines a notch in said jacketed fiber receiving surface for guiding the jacketed fiber into said channel.

4. The bushing as recited in claim 3, wherein said elastomeric structure has an expanded state, an undeformed state, and a compressed state, and when said elastomeric structure is in said expanded state, said channel has a width of approximately said diameter of said internal pathway, when said elastomeric structure is in said undeformed state, said channel has a width less than said diameter of said internal pathway, and when said elastomeric structure is in said compressed state, said channel has a width less than said width of said channel when said elastomeric structure is in said undeformed state.

5. A jacket retention system for securing the position of the protective jacket of a jacketed fiber with respect to a component, said jacket retention system comprising:

a component;

an elastomeric bushing, said elastomeric bushing having a first end, a second end, and a jacketed fiber receiving surface;

said elastomeric bushing defines an internal pathway from said first end to said second end, said internal pathway having a diameter approximately equal to the diameter of the jacketed fiber, said internal pathway for receiving the jacketed fiber, and said internal pathway running approximately along the centerline of said elastomeric bushing from said first end to said second end;

said elastomeric bushing defines a channel from said internal pathway to said jacketed fiber receiving surface, said channel extending along substantially the entire length of said internal pathway; and said component including first and second shells lying in separate planes and defining an opening therebetween for receiving said elastomeric bushing, said opening of said component being sized to compress said elastomeric bushing into a compressed state when said elastomeric bushing is inserted into said opening, said first and second shells including first and second cavities, respectively, for engaging said bushing to prevent rotation of said bushing with respect to said component.

6. The jacket retention system as recited in claim 5, wherein said elastomeric bushing has an expanded state, an undeformed state, and said compressed state, and when said elastomeric bushing is in said expanded state, said channel has a width at least as great as the diameter of the jacketed fiber, when said elastomeric structure is in said undeformed state, said channel has a width less than the diameter of the jacketed fiber, and when said elastomeric structure is in said compressed state, said channel has a width that is less than said width of said channel when said elastomeric structure is in said undeformed state.

7. The jacket retention system as recited in claim 5, wherein said elastomeric bushing further defines a notch in said jacketed fiber receiving surface for guiding the jacketed fiber into said channel.

8. The jacket retention system as recited in claim 5, wherein said elastomeric bushing defines exactly one internal pathway.

9. The jacket retention system as recited in claim 5, wherein said elastomeric bushing includes a first flange being dimensioned and arrayed to engage said first cavity of said component.

10. The jacket retention system as recited in claim 9, wherein said elastomeric bushing includes a second flange being dimensioned and arrayed to engage said second cavity of said component.

11. The jacket retention system as recited in claim 10, wherein said elastomeric bushing has an expanded state, an undeformed state, and said compressed state, and when said elastomeric bushing is in said expanded state, said channel has a width at least as great as the diameter of the jacketed fiber, when said elastomeric structure is in said undeformed state, said channel has a width less than the diameter of the jacketed fiber, and when said elastomeric structure is in said compressed state, said channel has a width that is less than said width of said channel when said elastomeric structure is in said undeformed state.

12. The jacket retention system as recited in claim 11, wherein said elastomeric bushing further defines a notch in said jacketed fiber receiving surface for guiding the jacketed fiber into said channel.

13. The jacket retention system as recited in claim 12, wherein said elastomeric bushing defines exactly one internal pathway.

14. A jacket retention system for securing the position of the protective jacket of a jacketed optical fiber with respect to an optical component, said jacket retention system comprising:

an optical component defining an opening;

an elastomeric bushing received in said opening of said optical component, said elastomeric bushing having a first end, a second end, and a jacketed fiber receiving surface;

said elastomeric bushing defines an internal pathway from said first end to said second end, said internal pathway having a diameter approximately equal to the diameter of the jacketed optical fiber, said internal pathway for receiving the jacketed optical fiber;

said elastomeric bushing defines a channel from said internal pathway to said jacketed fiber receiving surface, said channel extending along substantially the entire length of said internal pathway;

said elastomeric bushing defines a notch in said jacketed fiber receiving surface for guiding the jacketed optical fiber into said channel; and said elastomeric bushing has an expanded state, an undeformed state, and a compressed state, and when said elastomeric bushing is in said expanded state, said channel has a width at least as great as the diameter of the jacketed optical fiber, when said elastomeric structure is in said undeformed state, said channel has a width less than the diameter of the jacketed optical fiber, and when said elastomeric bushing is in said compressed state, said channel has a width that is less than said width of said channel when said elastomeric bushing is in said undeformed state, wherein said opening is sized to compress said elastomeric bushing into said compressed state with forces acting substantially along the entire length of said elastomeric bushing.

15. The jacket retention system as recited in claim 14, wherein said elastomeric bushing defines exactly one internal pathway and said internal pathway runs approximately along the longitudinal centerline of said elastomeric bushing from said first end to said second end.

16. The jacket retention system as recited in claim 14, wherein said optical component includes a first cavity and said elastomeric bushing includes a first flange being dimensioned and arrayed to engage said first cavity of said optical component.

17. The jacket retention system as recited in claim 16, wherein said optical component includes a second cavity and said elastomeric bushing includes a second flange being dimensioned and arrayed to engage said second cavity of said optical component.

18. The jacket retention system as recited in claim 17, wherein said elastomeric bushing defines exactly one internal pathway and said internal pathway runs approximately along the longitudinal centerline of said elastomeric bushing from said first end to said second end.

19. A method for securing the position of the protective jacket of a jacketed fiber with respect to a component, said method comprising the steps of:
providing an elastomeric bushing having a first end and a second end, and which defines an internal pathway from having a diameter approximately to the diameter of the jacketed fiber, said internal pathway running approximately along the centerline of said elastomeric busing from said first end to said second end;
engaging said jacketed fiber in said internal pathway;
compressing said elastomeric bushing into a compressed state; and
inserting said elastomeric bushing into an opening in the component, wherein said component compresses said elastomeric bushing by forces acting substantially along the entire length of said elastomeric bushing.

20. The method as recited in claim 19, further comprising the step of:
guiding said jacketed fiber into said internal pathway through a channel extending from said internal pathway to a jacketed fiber receiving surface of said elastomeric busing and extending along substantially the entire length of said internal pathway.

21. The method as recited in claim 20, wherein the step of providing an elastomeric bushing further comprises the step of providing an elastomeric bushing having an expanded state, an undeformed state, and a compressed state, and when said elastomeric bushing is in said expanded state, said channel has a width at least as great as the diameter of the jacketed fiber, when said elastomeric structure is in said undeformed state, said channel has a width less than the diameter of the jacketed fiber, and when said elastomeric structure is in said compressed state, said channel has a width that is less than said width of said channel when said elastomeric structure is in said undeformed state.

22. The method as recited in claim 20, further comprising the step of:
guiding said jacketed fiber into said channel through a notch in said jacketed fiber receiving surface.

23. The method as recited in claim 19 wherein the step of providing an elastomeric bushing further comprises the step of providing an elastomeric bushing having exactly one internal pathway.

24. The method as recited in claim 19 wherein the step of providing an elastomeric bushing further comprises the step of providing an elastomeric bushing having a first flange and a second flange.

25. The method as recited in claim 24 further comprising the step of engaging a first cavity of said component with said first flange and engaging a second cavity of said component with said second flange.

26. The method as recited in claim 25, further comprising the step of:
guiding said jacketed fiber into said internal pathway through a channel extending from said internal pathway to a jacketed fiber receiving surface of said elastomeric busing and extending along substantially the entire length of said internal pathway.

27. The method as recited in claim 26, wherein the step of providing an elastomeric bushing further comprises the step of providing an elastomeric bushing having an expanded state, an undeformed state, and a compressed state, and when said elastomeric bushing is in said expanded state, said channel has a width at least as great as the diameter of the jacketed fiber, when said elastomeric structure is in said undeformed state, said channel has a width less than the diameter of the jacketed fiber, and when said elastomeric structure is in said compressed state, said channel has a width that is less than said width of said channel when said elastomeric structure is in said undeformed state.

28. The method as recited in claim 27, further comprising the step of:
guiding said jacketed fiber into said channel through a notch in said jacketed fiber receiving surface.

29. The method as recited in claim 28 wherein the step of providing an elastomeric bushing further comprises the step of providing an elastomeric bushing having exactly one internal pathway.

* * * * *